United States Patent [19]
Chang et al.

[11] Patent Number: 5,765,103
[45] Date of Patent: Jun. 9, 1998

[54] SPATIALLY-ORIENTED SUBSCRIBER CONFIGURATION IN A FIXED WIRELESS SYSTEM

[75] Inventors: Chu-Rui Chang, Richardson; Shun Hua Zhou, Dallas; F. Marco Marchetti, Plano; Christopher S. Reece, Plano; Payam Maveddat, Plano; Gokul V. Subramaniam, Plano; Ramanathan Balachander, Dallas; Louis Perez, Richardson; Balaji S. Holur, Plano; Robert L. Hicks, Jr., Dallas, all of Tex.

[73] Assignee: Northern Telecom Limited, Montreal, Canada

[21] Appl. No.: 698,831

[22] Filed: Aug. 16, 1996

[51] Int. Cl.$^6$ ..................................................... H04Q 7/38
[52] U.S. Cl. ........................... 455/434; 455/440; 455/450
[58] Field of Search ........................... 455/63, 67.1, 411, 455/422, 423, 432, 433, 434, 435, 437, 443, 444, 440, 446, 448, 449, 450, 451, 452

[56] References Cited

U.S. PATENT DOCUMENTS

| | | | |
|---|---|---|---|
| 4,597,105 | 6/1986 | Freeburg | 455/443 |
| 5,275,905 | 1/1994 | Hurst et al. | 455/432 |
| 5,438,608 | 8/1995 | Kojima | 455/411 |
| 5,499,386 | 3/1996 | Karlsson | 455/437 |
| 5,655,002 | 8/1997 | Proctor et al. | 455/67.1 |

Primary Examiner—Reinhard J. Eisenzopf
Assistant Examiner—Lester G. Kincaid
Attorney, Agent, or Firm—Kenneth W. Bolvin; Robert C. Klinger; James A. Harrison

[57] ABSTRACT

While setting up a fixed wireless system, each subscriber radiotelephone is configured to a permanent home cell. Subscribers located at the border of a cell may be configured to multiple cells for better coverage. The signal levels at the border subscriber's position are received and the mean values of each determined. These mean values are listed in descending order. If the largest mean value is greater than a predetermined threshold, the subscriber is configured to only the home cell. If the largest mean value is within a predetermined range, the second largest mean value is evaluated to determine if it is within the predetermined range. If so, the subscriber is configured to both serving cells. If the second largest mean value is outside the predetermined range, the subscriber is configured to only the home cell.

23 Claims, 7 Drawing Sheets

FIG. 8

| SIGNAL LEVEL | PROBABILITY OF COVERAGE | |
|---|---|---|
| $S_{min} +2.0\sigma$ | 97.7% | |
| $S_{min} +1.9\sigma$ | 97.1% | |
| $S_{min} +1.8\sigma$ | 96.4% | |
| $S_{min} +1.7\sigma$ | 95.5% | |
| $S_{min} +1.6\sigma$ | 94.5% | |
| $S_{min} +1.5\sigma$ | 93.3% | |
| $S_{min} +1.4\sigma$ | 91.9% | |
| $S_{min} +1.3\sigma$ | 90.3% | ← T1 |
| $S_{min} +1.2\sigma$ | 88.5% | |
| $S_{min} +1.1\sigma$ | 86.4% | |
| $S_{min} +1.0\sigma$ | 84.1% | |
| $S_{min} +0.9\sigma$ | 81.6% | |
| $S_{min} +0.8\sigma$ | 78.8% | |
| $S_{min} +0.7\sigma$ | 75.8% | |
| $S_{min} +0.6\sigma$ | 72.6% | |
| $S_{min} +0.5\sigma$ | 69.2% | |
| $S_{min} +0.4\sigma$ | 65.5% | |
| $S_{min} +0.3\sigma$ | 61.8% | |
| $S_{min} +0.2\sigma$ | 57.9% | |
| $S_{min} +0.1\sigma$ | 54.0% | |
| $S_{min} +0.0\sigma$ | 50.0% | ← $S_{min}$ |
| $S_{min} -0.1\sigma$ | 46.0% | |
| $S_{min} -0.2\sigma$ | 42.1% | |
| $S_{min} -0.3\sigma$ | 38.2% | |
| $S_{min} -0.4\sigma$ | 34.5% | |
| $S_{min} -0.5\sigma$ | 30.9% | |
| $S_{min} -0.6\sigma$ | 27.4% | |
| $S_{min} -0.7\sigma$ | 24.2% | |
| $S_{min} -0.8\sigma$ | 21.2% | |
| $S_{min} -0.9\sigma$ | 18.4% | |
| $S_{min} -1.0\sigma$ | 15.9% | |

SPATIALLY-ORIENTED SUBSCRIBER CONFIGURATION IN A FIXED WIRELESS SYSTEM

BACKGROUND OF THE INVENTION

I. Field of the Invention

The present invention relates to radio communications. More particularly, the present invention relates to spatially configuring a subscriber radiotelephone in a fixed wireless access system.

II. Description of the Related Art

A cellular radio communication system is typically comprised of a number of cells covering a geographic region. Each cell is allocated a number of radio channels. The cell may also be divided up into sectors with each sector having a number of different channels.

In a typical mobile system, a subscriber is not configured to a specific cell. In these systems, a radio voice channel is allocated to the mobile subscriber for call initiation based on the Received Signal Strength Indicator (RSSI) and the availability of the radio voice channel. As the mobile subscriber moves through a cellular system's different cells, radio voice channels are dynamically allocated to the mobile as the channel's signal strength changes.

In a fixed wireless communication system, also known in the art as a wireless local loop system, each subscriber is typically configured to a specific cell on a permanent basis. This type of system uses radiotelephones that are not mobile. A fixed wireless system is an attractive solution to implement communications in developing countries or in rural areas of developed countries where the telecommunications infrastructure is inadequate.

For a subscriber radiotelephone located near the interior of a cell, identified as the home cell to the subscriber radiotelephone, the probability of receiving signal coverage is high. However, a radiotelephone located near the border of the cell may not receive signal coverage due to objects, such as terrain or large vehicles, shadowing the antenna from the subscriber radiotelephone. This effectively shrinks the size of the cell. This phenomenon is illustrated in FIG. 7.

The upper portion of FIG. 7 shows a subscriber (700) being configured to a home cell, Cell A. In this drawing, the home cell is providing normal coverage to the subscriber (700). The lower portion of FIG. 7 illustrates the shrinking of Cell A and the resulting loss of coverage experienced by the subscriber (700).

If a subscriber radiotelephone was initially configured to a home cell and the home cell shrinks, the received signal level could drop below the minimum signal level required to keep the connection. This minimum signal level is the radio's minimum sensitivity—the signal level below which the radio cannot detect a signal. In this case, the call is dropped or not set up, if it is a new call, since the subscriber is configured to only one home cell in wireless local loop systems. There is a resulting previously unknown need to provide improved coverage to subscribers located on the border of a cell in a wireless local loop system.

SUMMARY OF THE INVENTION

The process of the present invention assigns cellular radio service to a radiotelephone unit in a wireless local loop system. The process first measures, at the radiotelephone unit, a mean value signal for each radio control channel signal received from each cell of a set of cells of the cellular system. The set of cells is the cells that are within communication distance of the radiotelephone unit and includes the radiotelephone unit's home cell.

The process next identifies the cells with the largest and second largest mean values from the measured mean values. These mean values are compared with threshold level bands so as to categorize the cells based on into which threshold the particular mean value falls. The number of threshold levels is equal to the maximum number of serving cells allowed to be configured for a border cell radiotelephone unit.

If the largest mean value goes above the highest threshold level, the radiotelephone unit only needs to be assigned to the cell that generated the largest mean value, its home cell. If the largest mean value lies between the highest and lowest threshold levels, the radiotelephone unit is assigned to not only the home cell but also to the cells that generate sufficiently strong radio signals. If the largest mean value goes below the lowest threshold level, the radiotelephone unit cannot be set up to initiate a call or an ongoing call is dropped.

BRIEF DESCRIPTION OF THE DRAWINGS

FIG. 8 shows a table used to select threshold levels in a two serving cell embodiment.

DETAILED DESCRIPTION OF THE PREFERRED EMBODIMENT

The wireless local loop radiotelephone system of the present invention enables a wireless radiotelephone user to access the public switched telephone network. By averaging, over the space domain, the mean value of the signals received by the radiotelephone, the system can optimally configure the radiotelephone to additional neighboring cells beyond the radiotelephone's home cell.

Figure 1:
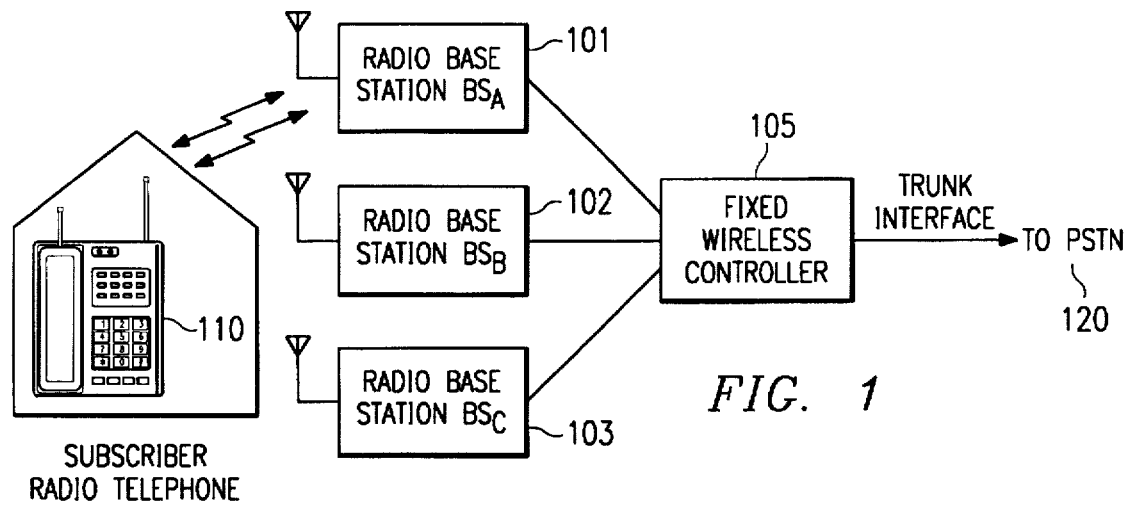
FIG. 1 shows a block diagram of a typical fixed, wireless radiotelephone system of the present invention.

FIG. 1 shows a block diagram of the fixed wireless radiotelephone system of the present invention. This cellular system is comprised of multiple base stations (101–103) that communicate radiotelephone signals with the fixed subscriber radiotelephone (110). Each base station (101–103) is comprised of multiple receivers and transmitters that operate in any RF band. However, the 800 and 900 MHz bands are typical for time division multiple access (TDMA) cellular service. This system can be installed in office buildings, parts of cities, or other places requiring telephone access without requiring telephone wiring to be installed.

The radio base stations (101-103) are connected to a fixed wireless controller (105). The controller (105) keeps track of which subscribers are configured to a particular base station (101, 102, or 103) and routes any calls from the public switched telephone network (PSTN) (120) to the appropriate base station (101, 102, or 103) for transmission to the subscriber radiotelephone (110).

Figure 2:
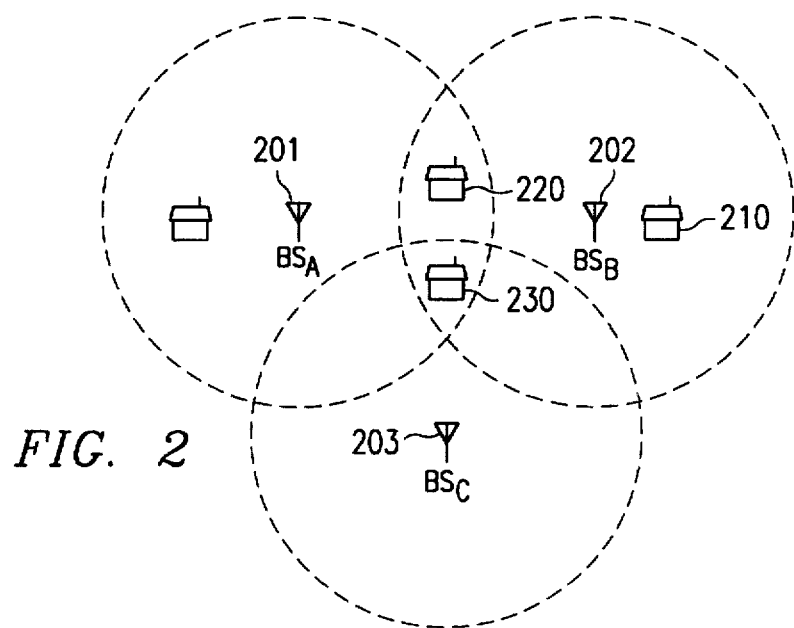
FIG. 2 shows a typical cell layout of the radiotelephone system of FIG. 1.

FIG. 2 illustrates the cell layout of the present invention. In this example, there are three base stations: $BS_A$, $BS_B$, and $BS_C$ (201-203). The fixed subscriber radiotelephones (210, 220, and 230) each communicate with the appropriate base station (210, 220, and 230). The processes of the present invention determine to which base station (201-203) each subscriber radiotelephone (210, 220, and 230) is configured.

One subscriber radiotelephone (210) may be configured to a single base station (202). Another radiotelephone (220) may be configured to two base stations (201 and 202) while yet another radiotelephone may be configured to all three stations (201-203).

The power received by a radiotelephone in the above wireless system is expressed as:

$$P_R(r) = P_0 \left( \frac{r}{r_0} \right)^{-\alpha} \cdot M(r) \cdot R(r) \text{ for } r > r_0$$

where:

$P_R(r)$=the received power at a distance r from the base station.

$P_0$=the received power at a close-in reference distance $r_0$.

r=the distance between the base station and the radiotelephone.

$r_0$=the close-in reference distance.

α=the path-loss slope.

In the preferred embodiment, the close-in reference distance is greater than 1.39·G·H where G is the antenna gain and H is the antenna height. The path-loss slope, α, also referred to as the propagation constant, is well known in the art. The path-loss slope is the rate of decay of signal strength as a function of distance and is typically in the range of 2–5 depending on the terrain and conditions. For example, a path-loss slope of 2 is without any obstructions while a path-loss slope of 5 would be a dense urban environment.

In the above equation, the component $$P_0 \left( \frac{r}{r_0} \right)^{-\alpha}$$

is the mean value of the received power, subsequently referred to as m. The component M(r) is the local mean, also referred to in the art as the long-term fading component. M(r) observes lognormal distribution around the mean value, m. M(r) varies due to the terrain contour between the base station and the radiotelephone.

The component R(r) is the multipath fading, or short-term fading, component. The variation of R(r) is due to the radio waves being reflected from man-made structures.

The local mean, M(r), is a Gaussian distributed random variable with a standard deviation of σ around the m. Both σ and M(r) are measured in dB. Typically, in an urban environment, σ=8 dB but could range between 4 dB and 12 dB, depending on the conditions of the actual terrain. The probability density function of M(r) can be expressed as:

$$f_M(x) = \frac{1}{\sqrt{2\pi\sigma^2}} \exp\left( \frac{-(x-m)^2}{2\sigma^2} \right).$$

Figure 5:
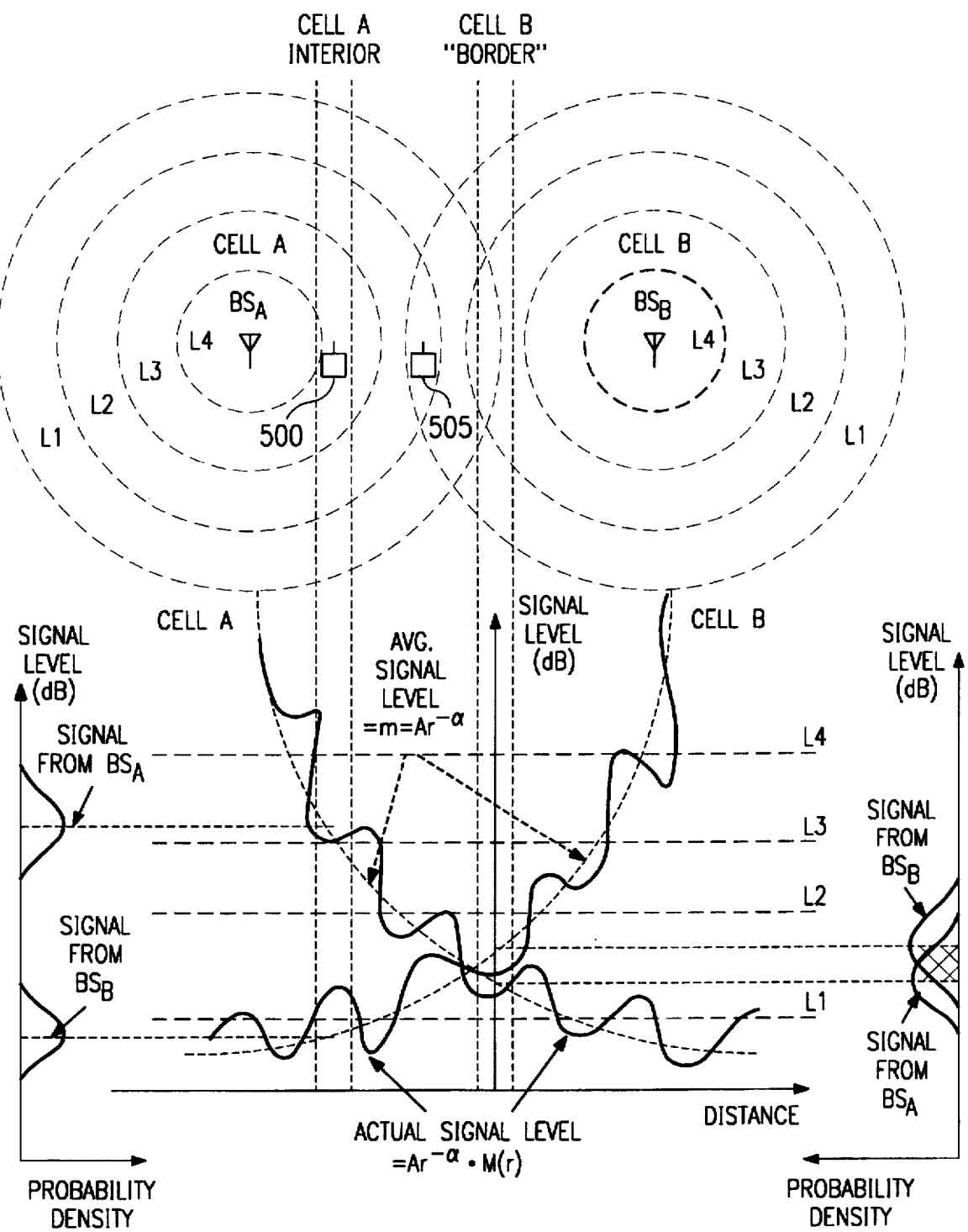
FIG. 5 shows a distribution of a local mean in a two-neighboring cell situation.

An example of the signal coverage in a border cell of the present invention is illustrated in FIG. 5. FIG. 5 shows the signal level contours and distribution of local mean values in the two-neighboring cell embodiment. This figure illustrates that in a home cell, Cell A, a subscriber (500) located in the interior of Cell A has a much higher mean signal level, $m_A$, received from its home cell, Cell A, than the mean signal level, $m_B$, received from its neighboring cell, Cell B. The two probability density functions of the signals from the two cells do not have much overlap. In otherwords, the probability that the signal from Cell B is higher than that from Cell A due to signal fluctuation is low. In this case, the subscriber should be configured to Cell A only.

A subscriber located at the border of Cell A (505), the overlapping region between Cells A and B, experiences a mean signal level from Cell B, $m_B$, only slightly higher than from Cell A, $m_A$. In this case, the two probability density functions have large overlapping areas. This means that even though $M_a > M_b$, there is a certain probability that the signal from Cell B is higher than that from Cell A due to signal fluctuations.

The probability that the signal received from a cell is higher than a particular value γ can be calculated from the probability density function as:

$$\begin{aligned} Pr[P_R(r) \gamma] &= \int_\gamma^\infty f_M(x)dx \\ &= \int_\gamma^\infty \frac{1}{\sqrt{2\pi\sigma^2}} \exp\left( \frac{-(x-m)^2}{2\sigma^2} \right) dx \\ &= Q\left( \frac{\gamma - m}{\sigma} \right) \end{aligned}$$

where Q(z) is a function with tabulated values, defined as:

$$Q(z) = \frac{1}{\sqrt{2\pi}} \int_z^\infty e^{-\frac{x^2}{2}} dx = 1 - Q(-z)$$

For the case of a home cell subscriber described in FIG. 5, $m_A$ is greater than $m_B$ by a large margin. If the measured signal level from Cell A is γ, then the probability that the received signal level from Cell B exceeding γ is the shaded area in FIG. 6, which is the integral of the probability density function $f_M(x)$ over the range (γ, ∞).

For the border cell subscriber example illustrated in FIG. 5 above, even though $m_A > m_B$, there is a certain probability that the signal from Cell B is higher than the signal from Cell A due to the signal fluctuation. If the measured signal level from Cell A is γ, then the probability of the received signal level from Cell B exceeding γ is the shaded area in FIG. 6, that is the integral of the probability density function $f_M(x)$ over the range (γ, ∞).

Figure 6:
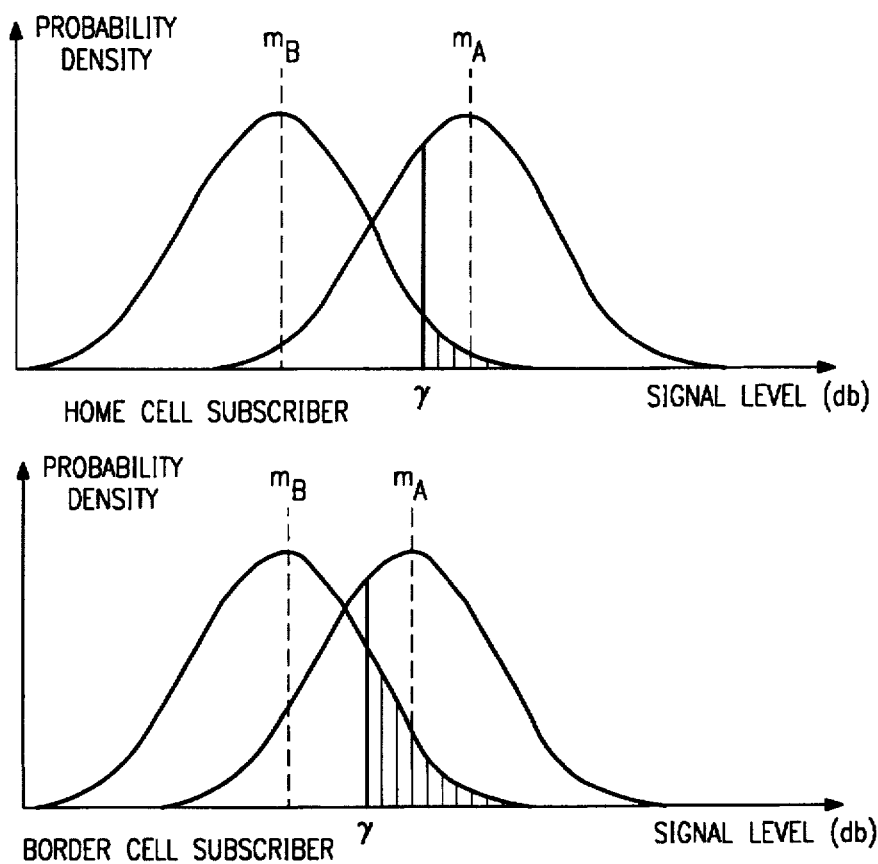
FIG. 6 shows a plot of probability density function versus signal level, as described from FIG. 5.

The probability density functions for $m_A$ and $m_B$ of the border example (505) of the FIG. 5 embodiment are illustrated in FIG. 6. This figure shows a graph of the probability density functions versus the signal level in decibels.

The lower graph of FIG. 6 shows that, near the Cell A border, the mean values, $m_A$ and $m_B$, are very close and the probability density functions are heavily overlapped. The upper graph of FIG. 6 shows that, for a home cell subscriber, the probability is small that the signal from Cell B is higher than that from Cell A.

The probability of a radiotelephone being covered by a cell is the integral of the probability density function $f_M(x)$ over the range $(S_{min}, \infty)$ where $S_{min}$ is the sensitivity of the radiotelephone. The minimum sensitivity of a radiotelephone depends on the manufacturer but is typically −110 dBm. As an example of a probability density function, for a mean value $m=S_{min}+1.0\sigma$, the corresponding probability of coverage is:

$$Pr(P_R \geq S_{min}) = Q\left(\frac{S_{min} - (S_{min} + 1.0\sigma)}{\sigma}\right)$$
$$= Q(-1.0)$$
$$= 1 - Q(1.0)$$
$$= 84.1\%$$

For a home cell subscriber located at the interior of the home cell, Cell A, the mean signal level received from Cell A, $m_A$, is strong enough to guarantee a high probability of RF coverage for the subscriber, such as 95% of the time in the preferred embodiment. Therefore, only Cell A should be configured to the subscriber.

For a border cell subscriber located at the overlapping area of Cell A and Cell B, the main signal level of Cell A, $m_A$, is not strong enough to guarantee a high probability of RF coverage for the subscriber, such as only 70% of the time in the preferred embodiment. To improve the probability of RF coverage, Cell B should be configured to the subscriber in addition to Cell A. With two serving cells, the overall probability of receiving RF coverage is improved.

Figure 3:
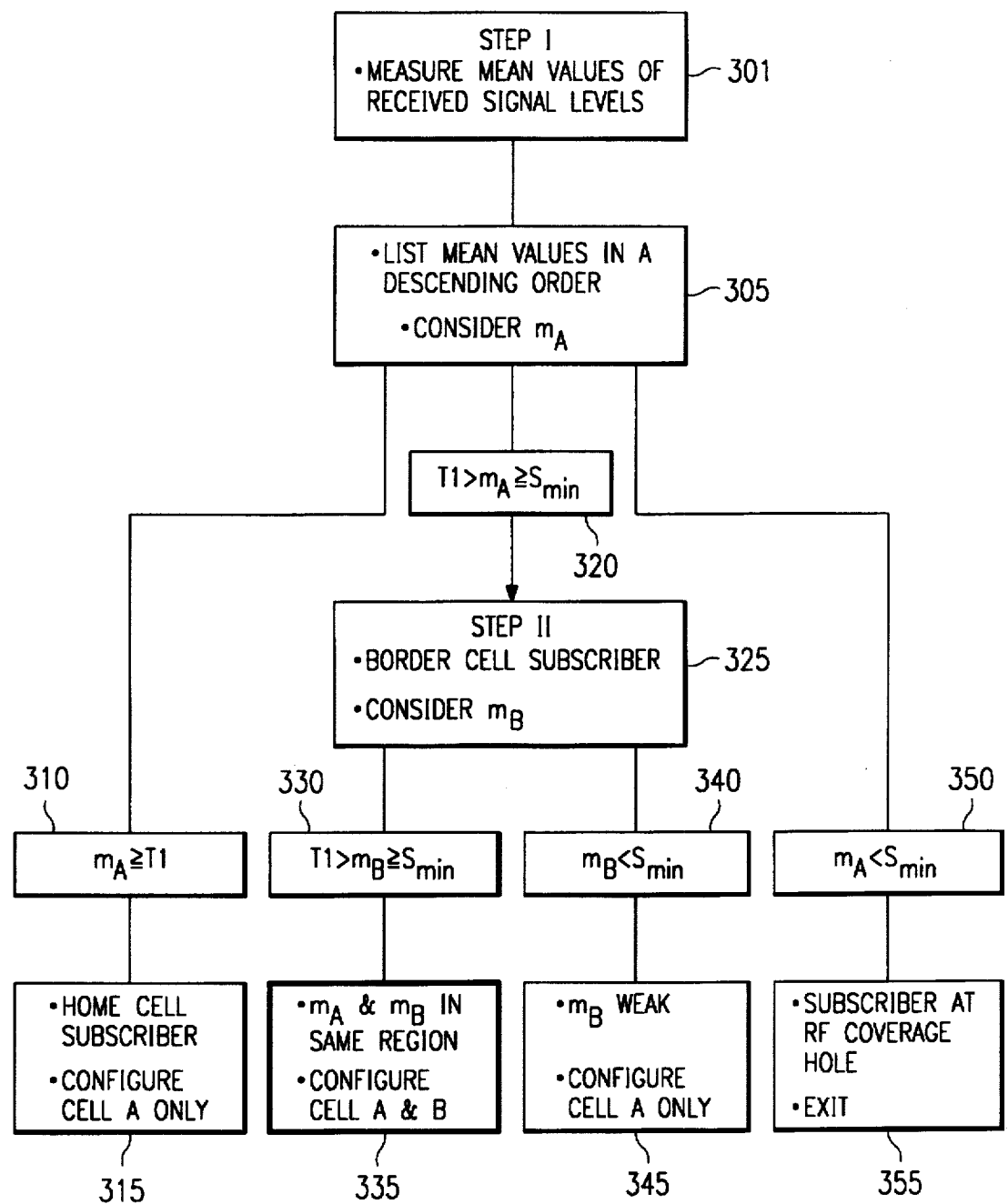
FIG. 3 shows a flowchart of a preferred embodiment process of the present invention.

The process of the present invention, illustrated in FIG. 3, is based on the mean values of the received signal levels from the neighboring cells within communication distance of the subscriber radiotelephone. In the preferred embodiment, the mean values are averaged over the space domain. This embodiment works for a maximum of two serving cells: the subscriber's home cell and a second serving cell.

The preferred embodiment process begins with the mean value signals of the received signal levels from the neighboring cells being measured (301) at the radio subscriber's location when the fixed wireless radiotelephone system of the present invention is installed. The mean values are then listed in descending order (305). For example, the mean values could be listed as follows:

| | |
|---|---|
| $m_A$: | Cell A gives the strongest signal level. |
| $m_B$: | Cell B gives the second strongest signal level. |
| . | |
| . | |
| . | |
| $m_K$: | Cell K gives the weakest signal level. |

The highest threshold level, $T_1$, is defined to separate the home cell subscribers from the border cell subscribers. This threshold level is associated with a high probability of coverage from a cell. It is made up of two parameters, the minimum radiotelephone sensitivity, $S_{min}$, and the standard deviation around the mean value, $\sigma$. These parameters are illustrated in FIG. 8.

The lowest threshold level, $S_{min}$, is the minimum radiotelephone sensitivity. It identifies the subscribers located at the radio coverage holes, to whom no serving cells are to be assigned. This is because $S_{min}$ is associated with a probability of coverage of only 50% on average. This is insufficient to guarantee satisfactory voice quality.

The value of $T_1$ is set by the service provider. It is a tradeoff between the voice quality and the system cost. $T_1$ can be modified later. As illustrated in the table of FIG. 8, $T_1$ could initially be defined as $T_1=S_{min}+1.3\sigma$. This leads to a corresponding probability of coverage of 90.3%:

$$Pr(P_R \geq S_{min}) = Q\left(\frac{S_{min} - (S_{min} + 1.3\sigma)}{\sigma}\right)$$
$$= Q(-1.3)$$
$$= 1 - Q(1.3)$$
$$= 90.3\%$$

If $m_A$, the mean value measured at the radiotelephone unit from Cell A, is greater than or equal to $T_1$, then the subscriber radiotelephone receives radio signal coverage from Cell A 90% of the time on average. This is the case of a home cell subscriber located at the interior of a cell.

If $T_1$ is set too low, such as $T_1=S_{min}+0.5\sigma$ with a probability of coverage of 69.2%, then those radiotelephones located at the inner border of the home cell, Cell A, are leniently identified as the home cell subscribers. These subscriber radiotelephones have no additional serving cells configured. This could result in possible unsatisfactory voice quality.

If $T_1$ is set too high, such as $T_1=S_{min}+1.7\sigma$ with a probability of coverage of 95.5%, then those who are located at the outer mid-point of the home cell, Cell A, are identified as the border cell subscribers. These subscribers will have additional cells configured that could result in unnecessary radio resource allocation.

Referring again to FIG. 3, if $m_A \geq T_1$ (310), the radiotelephone is identified as a home cell subscriber (315) and is configured to the home Cell A only. If $m_A < S_{min}$ (350), the radiotelephone cannot receive a signal strong enough for communication. In this case, the subscriber cannot be configured to any of the cells (355).

If $T_1 > m_A \geq S_{min}$ (320), the radiotelephone is identified as a border cell subscriber (325). In this case, the second largest mean value signal, $m_B$, is examined to determine if the subscriber should be assigned to another cell.

If $T_1 > m_B \geq S_{min}$ (330), then the mean values for both Cell A and Cell B are in the same region. In this case, the radiotelephone is configured to cells A and B (335). If $m_B < S_{min}$ (340), then the signal from Cell B is too weak to be used by the radiotelephone. In this case, the radiotelephone is configured as a Cell A subscriber only (345).

Figure 4:
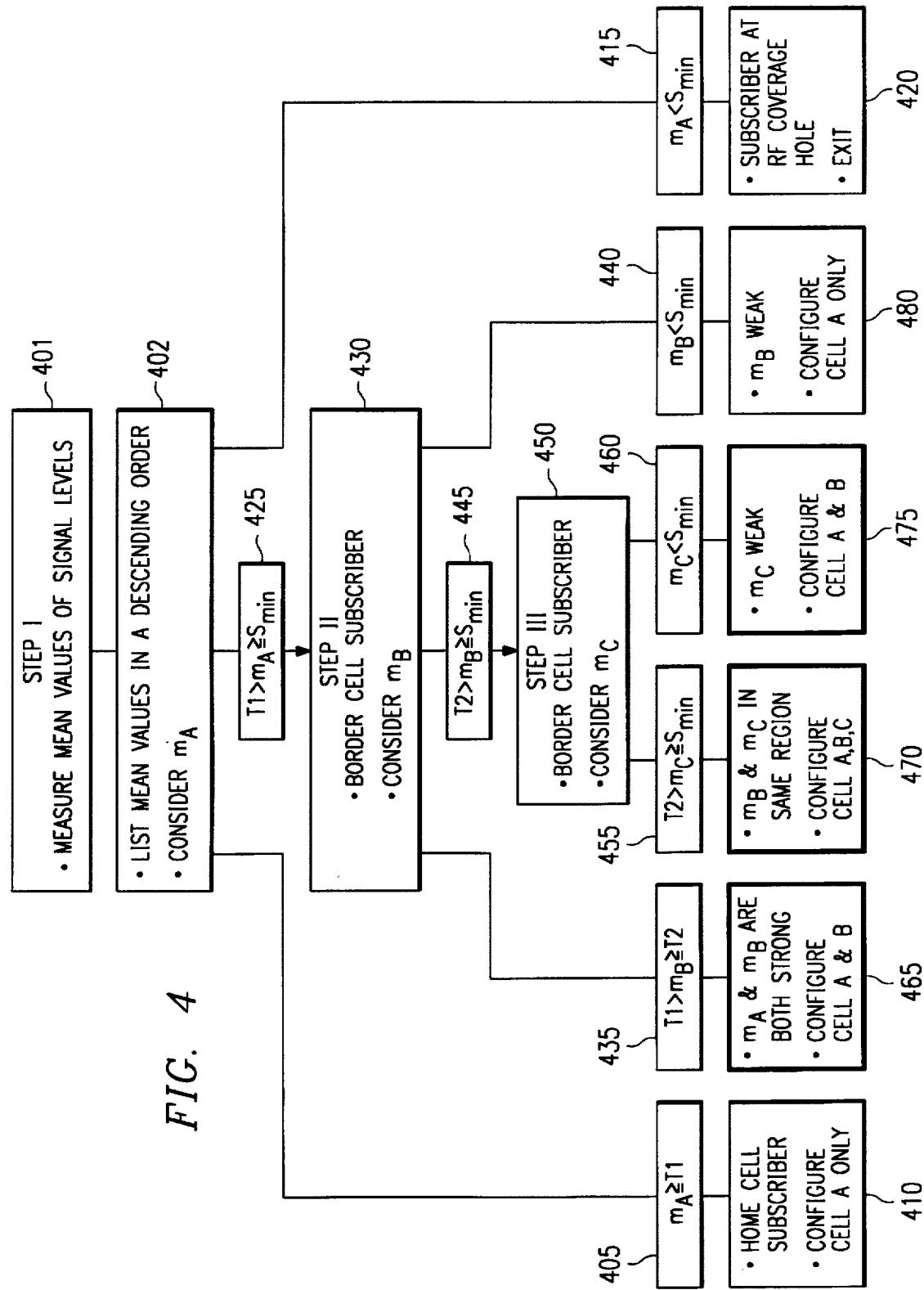
FIG. 4 shows a flowchart of an alternate embodiment process of the present invention.

A flowchart of an alternate embodiment process of the present invention is illustrated in FIG. 4. This embodiment determines if the radiotelephone subscriber should be assigned to three serving cells.

In any alternate embodiments using more than one additional serving cell for border cell subscribers, additional thresholds are required. If the maximum number of serving cells to be configured to a border cell subscriber is N ($N \geq 1$) then an additional N−2 thresholds need to be defined besides $T_1$ and Smin. These additional threshold levels are defined in the same way $T_1$ is defined, but with lower probability of coverage from an associated cell. For example, the alternate embodiment using three serving cells (N=3) requires one additional threshold. This threshold is subsequently referred to as $T_2$.

The process of the alternate embodiment begins with measuring the mean value signals of the received signals from the neighboring cells (401). These mean values are listed in a descending order (402) to determine the largest mean value, the second largest mean value, and the third largest mean value.

If the largest mean value, $m_A$, is greater than or equal to the threshold, $T_1$ (405), the radiotelephone is configured as a home cell subscriber (410). In this case, since the received signal is strong enough for adequate communications, a back-up service cell is not required. If the largest mean value is less than the minimum threshold, $S_{min}$ (415), then even the home cell cannot provide adequate coverage to enable the radiotelephone to communicate with the system (420).

If $T_1 > m_A \geq S_{min}$ (425), the radiotelephone is identified as a border cell subscriber (430). The alternate embodiment process then considers the second largest mean value $m_B$ (430). If $T_1 > m_B \geq T_2$ (435), the mean values from the home Cell A and the second service Cell B are considered strong and the radiotelephone is configured to both cells (465). If $m_B < S_{min}$ (440), the signal from the second service cell is too weak for use and the radiotelephone is configured to the home Cell A only (480).

If $T_2 > M_B \geq S_{min}$ (445), the radiotelephone is again identified as a border cell subscriber (450). In this case, the signal from Cell B may not be strong enough to configure just to cells A and B and a third service cell is needed. Therefore, the third largest mean value, $m_C$, needs to be considered.

If $T_2 > m_C \geq S_{min}$ (455), the mean values from cells B and C are in the same region. In this case, the subscriber radiotelephone is configured to cells A, B, and C (470) since the radiotelephone is receiving adequate signals from all three cells.

If $m_C < S_{min}$ (460), the mean value of the signal from cell C is too weak for use by the radiotelephone. Therefore, the subscriber will be configured for cells A and B (475).

Figure 9:
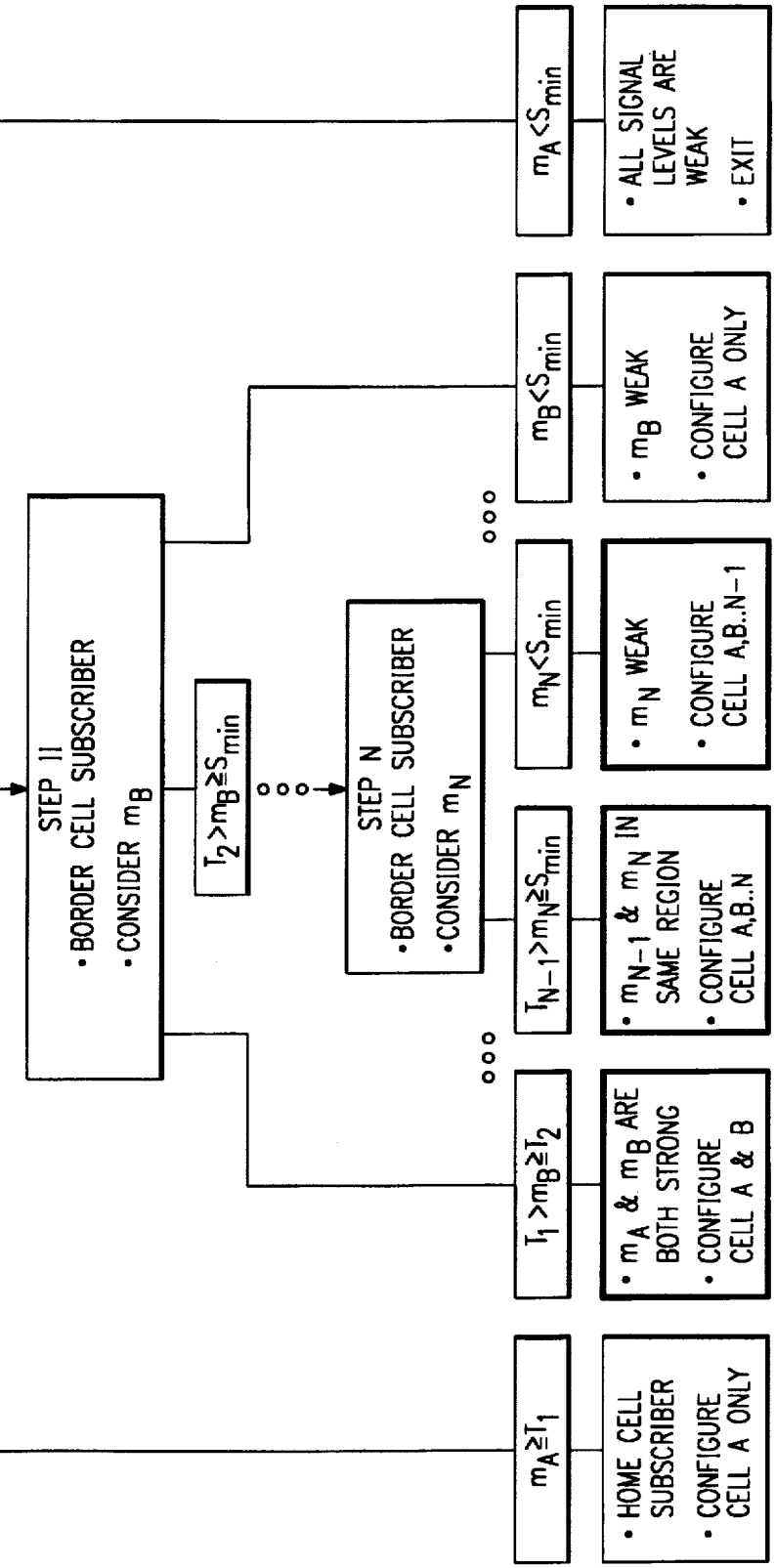
FIG. 9 shows another alternate embodiment of the process of the present invention.

FIG. 9 illustrates another alternate embodiment of the present invention. This embodiment is a generic embodiment in which a subscriber radiotelephone is assigned to N serving cells.

The above described embodiments are only examples of the process of the present invention. This process can be extended to configuring service cells beyond three if necessary due to terrain, buildings, or other factors. Determining the number of serving cells is a choice of cost versus quality. The more serving cells to which a radiotelephone is configured improves the quality of the communications but also increases the cost due to resource allocation, such as additional cell radios to handle the potential additional subscriber radiotelephones.

Figures 7, 10:
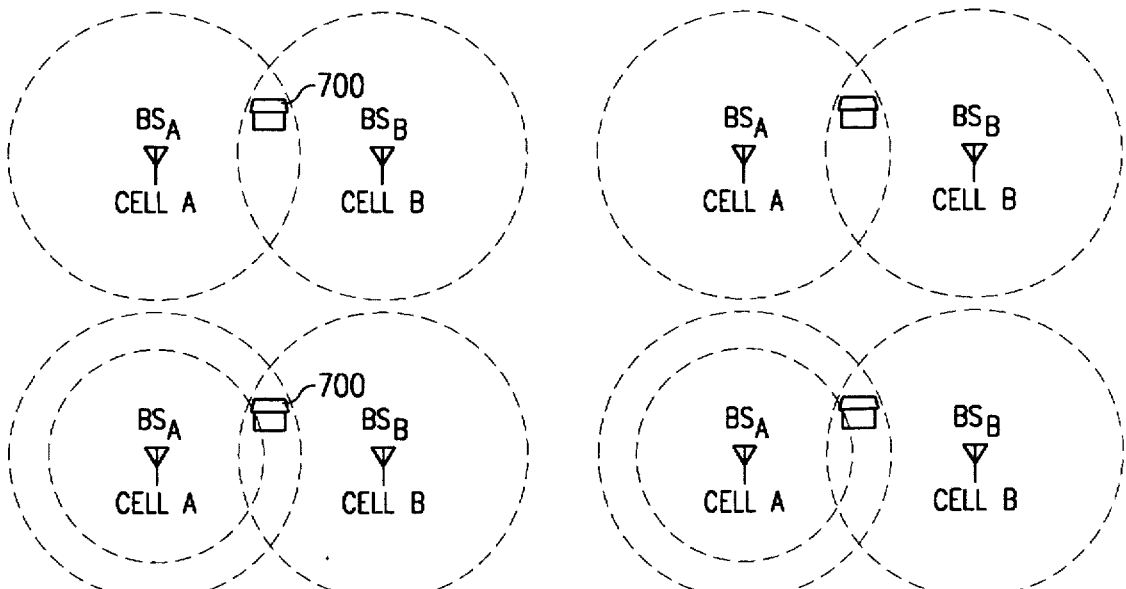
FIG. 7 shows a typical cell layout experiencing the cell breathing phenomenon.
FIG. 10 shows a fixed wireless access system's RF coverage using the present invention.

An example of one benefit of the present invention is illustrated in FIG. 10. The upper portion of this figure shows a subscriber configured to both Cells A and B, with Cell A being the home cell. If the coverage of Cell A shrinks, as illustrated in the lower portion, coverage from Cell A is lost. However, since the subscriber is still within Cell B's coverage area, communication ability is not lost.

It is obvious from the above description that the process and system of the present invention improves the quality of the communications for a subscriber on the border of a cell in a fixed wireless system. By configuring the radiotelephone to additional serving cells besides the home cell, when one of the cell's coverage areas changes the other serving cells enable the subscriber to continue the communication uninterrupted.

We claim:

1. A method for assigning cellular radio service to a radio unit in a fixed wireless cellular system, the system communicating radio signals through a plurality of cells, the method comprising the steps of:

measuring a mean value signal for a radio signal received from each cell of a set of cells of the cellular system;

determining a largest mean value signal of the measured mean value signals;

determining a second largest mean value signal of the measured mean value signals;

if the largest mean value signal is greater than the predetermined range of mean value signals, assigning the radio unit to a home cell; and if both the largest and second largest mean value signals are within the predetermined range of mean value signals, assigning the radio unit to both the home cell and a second service cell.

2. The method of claim 1 wherein the predetermined range of mean value signals has an upper threshold and a lower threshold, the lower threshold being the minimum radio sensitivity.

3. The method of claim 2 and further including the step of assigning the radio unit only to the home cell if the largest mean value signal is greater than or equal to the upper threshold.

4. The method of claim 2 and further including the step of preventing a call between the radio unit and the home cell from being established when the largest mean value signal is less than the lower threshold.

5. The method of claim 2 wherein the step of assigning the radio unit to both the home cell and the second cell includes assigning the radio unit when both the largest and second largest mean value signals are less than the upper threshold and greater than or equal to the lower threshold.

6. The method of claim 2 and further including the step of assigning the radio unit only to the home cell if the second largest mean value signal is less than the lower threshold.

7. The method of claim 2 wherein the predetermined range of mean value signals is further comprised of an upper range and a lower range, the upper range bounded by the upper threshold and a minimum threshold, the lower range bounded by a second upper threshold and the lower threshold, the step of assigning the radio unit to both the home and second service cells further comprising the steps of:

comparing the second largest mean value signal to the upper range of the predetermined range of mean value signals;

if the second largest mean value signal is within the upper range, assigning the radio unit to both the home cell and the second service cell; and if the second largest mean value signal is less than the lower threshold, assigning the radio unit only to the home cell.

8. The method of claim 7 and further including the steps of:

if the second largest mean value signal is within the predetermined range, determining a third largest mean value signal;

if the third largest mean value signal is within the lower range, assigning the radio unit to the home cell, the second service cell, and a third service cell; and if the third largest mean value signal is less than the lower threshold, assigning the radio unit to the home cell and the second service cell.

9. The method of claim 8 wherein the step of determining the third largest mean value signal includes determining the third largest mean value signal if the second largest mean value signal is less than the upper threshold and greater than or equal to the lower threshold.

10. A method for assigning cellular radiotelephone service to a radiotelephone operating in a fixed wireless cellular system, the radiotelephone communicating with the system via radiotelephone signals, the system comprising a plurality of cells, the method comprising the steps of:

measuring a mean value signal for each radiotelephone signal received from each cell of a set of cells of the cellular system;

determining a largest mean value signal of the measured mean value signals;

if the largest mean value signal is greater than or equal to a maximum threshold, assigning the radiotelephone to use a predetermined home cell of the set of cells;

if the largest mean value signal is less than a minimum threshold, preventing a call between the radiotelephone and the cellular system;

if the largest mean value signal is between the maximum and the minimum thresholds, determining a second largest mean value signal of the measured mean value signals;

if the second largest mean value signal is less than the maximum threshold and greater than or equal to a mid-level threshold, assigning the radiotelephone to use the home cell and a second service cell that generated the radiotelephone signal having the second largest mean value signal;

if the second largest mean value signal is less than the mid-level threshold and greater than or equal to the minimum threshold, determining a third largest mean value signal of the measured mean value signals; and if the third largest mean value signal is less than the mid-level threshold and greater than or equal to the minimum threshold, assigning the radiotelephone to use the home cell, the second service cell, and a third service cell that generated the radiotelephone signal having the third largest mean value signal.

11. The method of claim 10 wherein the set of cells is comprised of cells within a distance of the radiotelephone such that the radiotelephone can communicate with the cells.

12. The method of claim 10 and further including the step of assigning the radiotelephone to only use the home cell if the second largest mean value signal is less than the minimum threshold.

13. The method of claim 10 wherein the minimum threshold is the minimum radio sensitivity.

14. The method of claim 10 and further including the step of if the third largest mean value signal is less than the minimum threshold, assigning the radiotelephone to only use the home cell and the second service cell.

15. A method for assigning cells to a cellular radiotelephone in a fixed wireless cellular system, the radiotelephone communicating with the cells via radiotelephone signals, the method comprising the steps of:

measuring a mean value for each radiotelephone signal received from each cell of a set of cells of the cellular system, the set of cells being within communication distance of the radiotelephone;

determining a largest mean value of the measured mean values, the largest mean value being measured from a radiotelephone signal received from a first cell of the set of cells;

if the largest mean value is within a predetermined range of mean values, determining a second largest mean value of the measured mean values, the second largest mean value being measured from a radiotelephone signal received from a second cell of the set of cells;

if the second largest mean value is within a first sub-range of the predetermined range of mean values, assigning the first and second cells to the radiotelephone;

if the second largest mean value is within a second sub-range of the predetermined range of mean values, determining a third largest mean value of the measured mean values, the third largest mean value being measured from a radiotelephone signal received from a third cell of the set of cells; and if the third largest mean value is within the second sub-range, assigning the first, second, and third cells to the radiotelephone.

16. The method of claim 15 wherein the predetermined range of mean values has a maximum range threshold and a minimum range threshold, the minimum range threshold being the radiotelephone's minimum sensitivity.

17. The method of claim 16 wherein the first sub-range has a first maximum sub-range threshold substantially equal to the maximum range threshold and a first minimum sub-range threshold substantially equal to a mean value that is greater than the minimum range threshold.

18. The method of claim 16 wherein the second sub-range has a second maximum sub-range threshold substantially equal to the first minimum sub-range threshold and a second minimum sub-range threshold substantially equal to the radiotelephone's minimum sensitivity.

19. The method of claim 17 wherein the second largest mean value being within the first sub-range includes being less than the first maximum sub-range threshold and greater than or equal to the first minimum sub-range threshold.

20. The method of claim 18 wherein the third largest mean value being within the second sub-range includes being less than the second maximum sub-range threshold and greater than or equal to the second minimum sub-range threshold.

21. The method of claim 15 and further including the step of:

if the third largest mean value is less than the second sub-range, assigning the first and second cells to the radiotelephone.

22. The method of claim 16 and further including the step of:

if the second largest mean value is less than the minimum range threshold, assigning the first cell to the radiotelephone.

23. The method of claim 16 and further including the step of:

if the largest mean value is less than the minimum range threshold, dropping a call between the radiotelephone and the cellular system.

* * * * *